United States Patent
Iida et al.

(10) Patent No.: US 9,859,595 B2
(45) Date of Patent: Jan. 2, 2018

(54) ELECTRODE, METHOD FOR MANUFACTURING THE SAME, AND SECONDARY BATTERY

(71) Applicant: SONY CORPORATION, Tokyo (JP)

(72) Inventors: Hironori Iida, Kanagawa (JP); Seiichiro Tabata, Kanagawa (JP); Shun Yamanoi, Kanagawa (JP); Shinichiro Yamada, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 19 days.

(21) Appl. No.: 14/772,485

(22) PCT Filed: Mar. 20, 2014

(86) PCT No.: PCT/JP2014/057828
§ 371 (c)(1),
(2) Date: Sep. 3, 2015

(87) PCT Pub. No.: WO2014/167981
PCT Pub. Date: Oct. 16, 2014

(65) Prior Publication Data
US 2016/0028135 A1    Jan. 28, 2016

(30) Foreign Application Priority Data
Apr. 11, 2013   (JP) ................. 2013-082692

(51) Int. Cl.
| | | |
|---|---|---|
| *H01M 12/08* | (2006.01) | |
| *H01M 4/96* | (2006.01) | |
| *C01B 32/05* | (2017.01) | |
| *C01B 32/336* | (2017.01) | |
| *C01B 32/342* | (2017.01) | |

(52) U.S. Cl.
CPC ............ *H01M 12/08* (2013.01); *C01B 32/05* (2017.08); *C01B 32/336* (2017.08); *C01B 32/342* (2017.08); *H01M 4/96* (2013.01); *H01M 2220/30* (2013.01); *Y02E 60/128* (2013.01)

(58) Field of Classification Search
None
See application file for complete search history.

(56) References Cited

U.S. PATENT DOCUMENTS

2011/0244012 A1* 10/2011 Iida et al. ............. A01N 59/16
424/409

FOREIGN PATENT DOCUMENTS

| JP | 10-021919 A | 1/1998 |
|---|---|---|
| JP | 2002-015737 A | 1/2002 |
| JP | 2006-297368 A | 11/2006 |

(Continued)

OTHER PUBLICATIONS

Machine English translation of JP 2006-297368.*

*Primary Examiner* — Scott J Chmielecki
(74) *Attorney, Agent, or Firm* — Chip Law Group

(57) ABSTRACT

An electrode includes a plant-derived porous carbon material. When a peak value of an O(1s) spectrum of the porous carbon material obtained by X-ray photoelectron spectroscopy is defined as $P_O$, and a peak value of a C(1s) spectrum thereof is defined as $P_C$, $P_O/P_C \leq 0.05$, or an oxygen-containing functional group has been removed from a surface of the plant-derived porous carbon material.

18 Claims, 5 Drawing Sheets

(56) References Cited

FOREIGN PATENT DOCUMENTS

| JP | 2006297368 A | * | 11/2006 |
| JP | 2009525247 A | | 7/2009 |
| JP | 2010-104979 A | | 5/2010 |
| JP | 2010-208872 A | | 9/2010 |
| JP | 2010-244729 A | | 10/2010 |

* cited by examiner

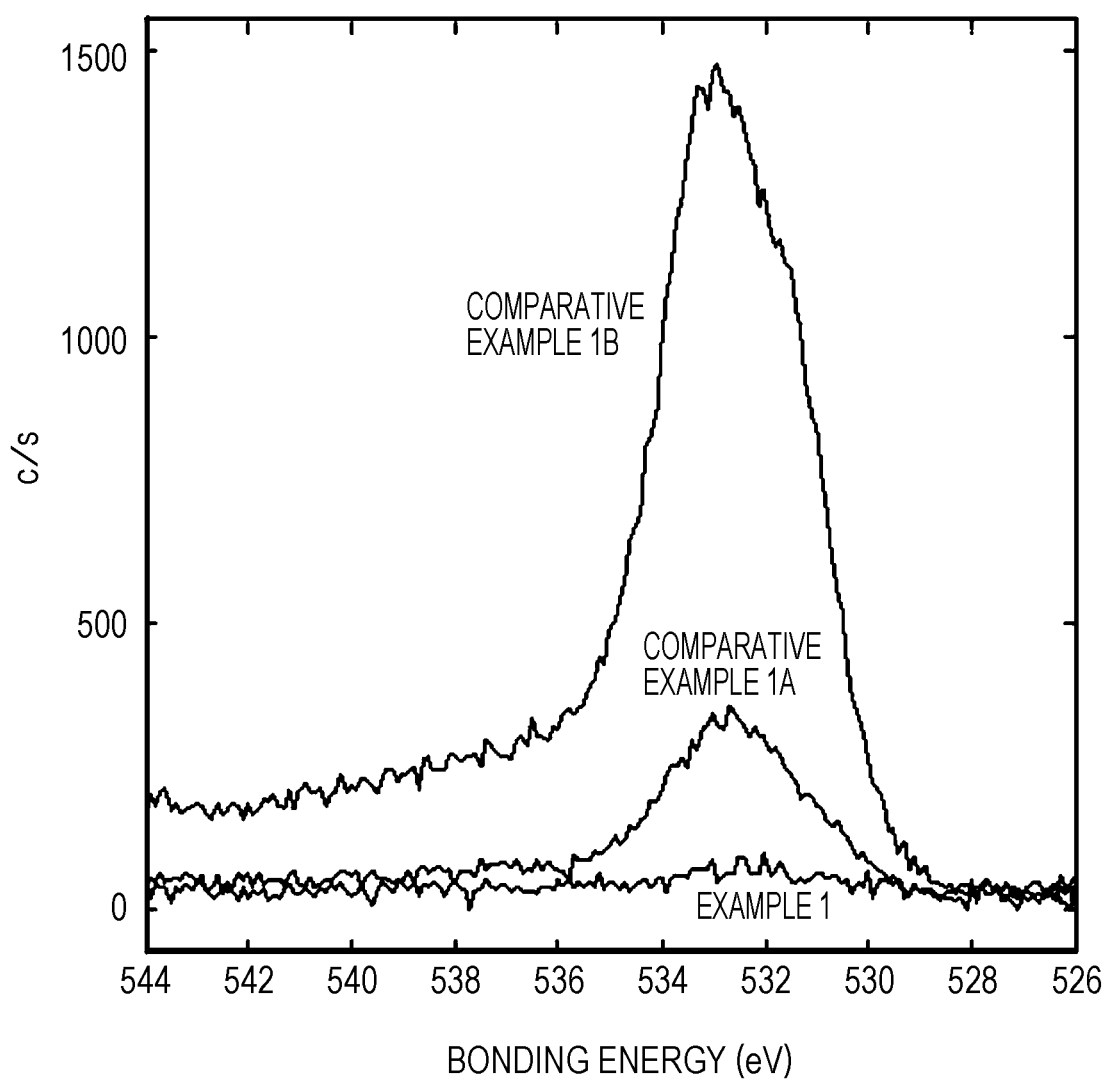

ELECTRODE, METHOD FOR MANUFACTURING THE SAME, AND SECONDARY BATTERY

TECHNICAL FIELD

The present disclosure relates to an electrode, a method for manufacturing the same, and a secondary battery.

BACKGROUND ART

An air-metal secondary battery uses a metal having a high energy density as a negative electrode active material, and uses oxygen in air as a positive electrode active material. Therefore, the air-metal secondary battery can obtain a large energy density theoretically. For example, JP 2002-015737 A discloses a nonaqueous electrolyte battery including a positive electrode, a negative electrode, and a nonaqueous electrolyte layer. The positive electrode mainly includes a carbonaceous material in which a pore volume occupied by a pore having a diameter of 1 nm or more is 1.0 mL/g or more. The negative electrode includes a negative electrode active material absorbing and releasing a metal ion. The nonaqueous electrolyte layer is sandwiched between the positive electrode and the negative electrode.

CITATION LIST

Patent Document

Patent Document 1: JP 2002-015737 A

SUMMARY OF THE INVENTION

Problems to be Solved by the Invention

By the way, there are various problems for practical use of an air-metal secondary battery, for example, an air-lithium secondary battery. As one of the problems, poor charge-discharge cycle characteristics can be mentioned. That is, in the air-metal secondary battery, a discharge capacity is remarkably and largely decreased when the battery is repeatedly charged and discharged. However, the above-described patent application laid open does not mention improvement of the charge-discharge cycle characteristics at all.

Therefore, an object of the present disclosure is to provide an electrode for obtaining a secondary battery having excellent charge-discharge cycle characteristics, a method for manufacturing the electrode, and a secondary battery using the electrode.

Solutions to Problems

An electrode according to a first embodiment of the present disclosure to accomplish the above-described object includes a plant-derived porous carbon material. In the electrode, when a peak area of an O(1s) spectrum of the porous carbon material obtained by X-ray photoelectron spectroscopy is defined as $P_O$, and a peak area of a C(1s) spectrum thereof is defined as $P_C$, $P_O/P_C \leq 0.05$, preferably $P_O/P_C \leq 0.01$.

An electrode according to a second embodiment of the present disclosure to accomplish the above-described object includes a plant-derived porous carbon material from a surface of which an oxygen-containing functional group has been removed.

A secondary battery according to the first embodiment of the present disclosure to accomplish the above-described object includes an electrode containing a plant-derived porous carbon material. In the secondary battery, when a peak area of an O(1s) spectrum of the porous carbon material obtained by X-ray photoelectron spectroscopy is defined as $P_O$, and a peak area of a C(1s) spectrum thereof is defined as $P_C$, $P_O/P_C \leq 0.05$, preferably $P_O/P_C \leq 0.01$.

A secondary battery according to the second embodiment of the present disclosure to accomplish the above-described object includes an electrode containing a plant-derived porous carbon material from a surface of which an oxygen-containing functional group has been removed.

A method for manufacturing an electrode according to the first embodiment of the present disclosure to accomplish the above-described object is a method for manufacturing an electrode including a plant-derived porous carbon material, in which, when a peak area of an O(1s) spectrum of the porous carbon material obtained by X-ray photoelectron spectroscopy is defined as $P_O$, and a peak area of a C(1s) spectrum thereof is defined as $P_C$, $P_O/P_C \leq 0.05$, preferably $P_O/P_C \leq 0.01$. The porous carbon material is obtained by carbonizing a plant-derived material at 400° C. to 1400° C., then treating the plant-derived material with an acid or an alkali, and then heating the plant-derived material at a temperature higher than the temperature in the carbonization.

A method for manufacturing an electrode according to the second embodiment of the present disclosure to accomplish the above-described object is a method for manufacturing an electrode including a plant-derived porous carbon material from a surface of which an oxygen-containing functional group has been removed. The porous carbon material is obtained by carbonizing a plant-derived material at 400° C. to 1400° C., then treating the plant-derived material with an acid or an alkali, and then heating the plant-derived material at a temperature higher than the temperature in the carbonization.

A method for manufacturing an electrode according to a third embodiment of the present disclosure to accomplish the above-described object is a method for manufacturing an electrode including a plant-derived porous carbon material from a surface of which an oxygen-containing functional group has been removed. The porous carbon material is obtained by carbonizing a plant-derived material at 400° C. to 1400° C., then treating the plant-derived material with an acid or an alkali, and then removing an oxygen-containing functional group from a surface of the porous carbon material.

Effects of the Invention

In the electrode, the method for manufacturing the electrode, and the secondary battery according to the first embodiment of the present disclosure, a ratio between $P_O$ and $P_C$ is defined. In the electrode, the method for manufacturing the electrode, and the secondary battery according to the second embodiment of the present disclosure, an oxygen-containing functional group has been removed from a surface of a porous carbon material included in the electrode. In the method for manufacturing an electrode according to the third embodiment of the present disclosure, an oxygen-containing functional group is removed from a surface of a porous carbon material. As a result, a secondary battery having excellent charge-discharge cycle characteristics can be provided.

BRIEF DESCRIPTION OF DRAWINGS

Each of FIG. 1A

FIG. 5 is a graph illustrating spectra of O(1s) of the porous carbon materials in Example 1 and Comparative Examples 1A and 1B obtained by X-ray photoelectron spectroscopy.

MODE FOR CARRYING OUT THE INVENTION

Figure 1A:
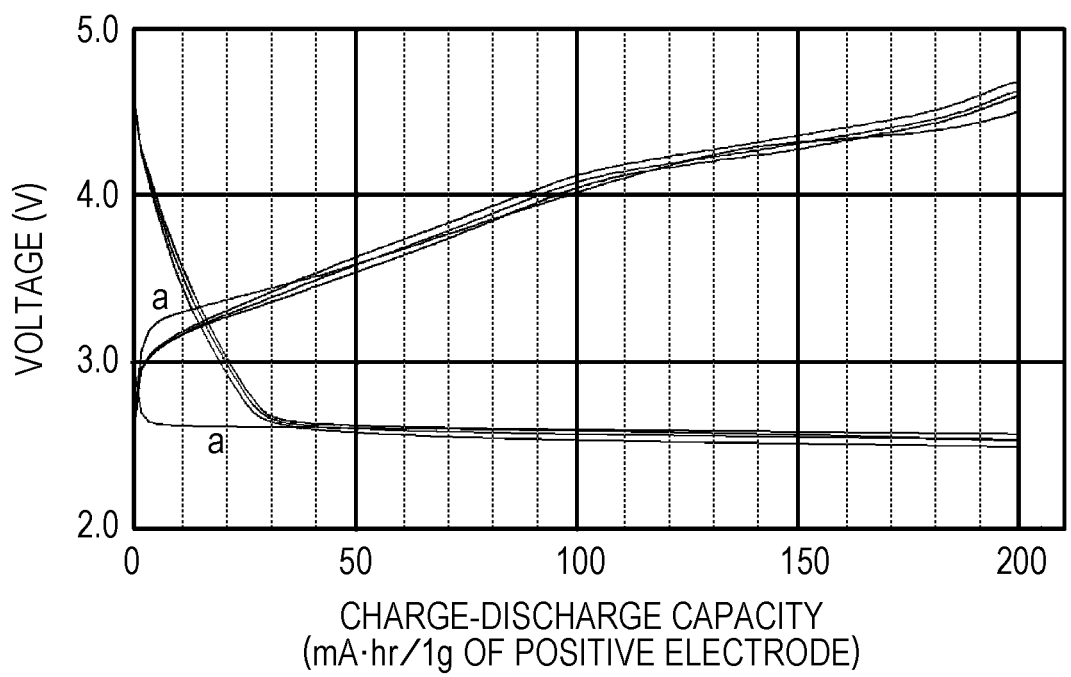
FIG. 1B is a graph illustrating charge-discharge curves in the first cycle (first time), the tenth cycle, the fifteenth cycle, and the twentieth cycle of secondary batteries in Example 1 and Comparative Example 1A.

Hereinafter, the present disclosure will be described based on Examples with reference to the drawings. However, the present disclosure is not limited to Examples, and various numerical values and materials in Examples are illustrative. The description will be made in the following order.

1. The electrodes and the secondary batteries according to the first and second embodiments of the present disclosure, the methods for manufacturing an electrode according to the first to third embodiments of the present disclosure, and description about the whole 2. Example 1 (the electrodes and the secondary batteries according to the first and second embodiments of the present disclosure, and the methods for manufacturing an electrode according to the first to third embodiments of the present disclosure), and others

[The Electrodes and the Secondary Batteries According to the First and Second Embodiments of the Present Disclosure, the Methods for Manufacturing an Electrode According to the First to Third Embodiments of the Present Disclosure, and Description about the Whole]

Hereinafter, the electrode, the method for manufacturing the electrode, and the secondary battery according to the first embodiment of the present disclosure are sometimes collectively referred to as "the first embodiment of the present disclosure." The electrode, the method for manufacturing the electrode, and the secondary battery according to the second embodiment of the present disclosure are sometimes collectively referred to as "the second embodiment of the present disclosure."

In the method for manufacturing an electrode according to the second or third embodiment of the present disclosure, examples of an oxygen-containing functional group include a carboxy group, a lactone group, a phenol group, a carbonyl group, an ether group, a quinone group, and a hydroxyl group.

In the methods for manufacturing an electrode according to the first to third embodiments of the present disclosure including the above-described preferable configurations, the porous carbon material may have a value of specific surface area by a nitrogen BET method of 100 $m^2/g$ or more, preferably 1000 $m^2/g$ or more, more preferably 1500 $m^2/g$ or more, has a total pore volume by a BET method of preferably 1.3 $cm^3/g$ or more, has a pore volume by a BJH method of 0.1 $cm^3/g$ or more, preferably 0.9 $cm^3/g$ or more, and has a pore volume by a MP method of 0.1 $cm^3/g$ or more, preferably 0.6 $cm^3/g$ or more. In the methods for manufacturing an electrode according to the first to third embodiments of the present disclosure including these preferable configurations, the porous carbon material may include a plant-derived material having a silicon (Si) content of 5% by mass or more as a raw material. That is, the silicon (Si) content in the raw material (plant-derived material before carbonization) is preferably 5% by mass or more. The silicon (Si) content in the porous carbon material is not limited, but is less than 5% by mass, preferably 3% by mass or less, more preferably 1% by mass or less.

In the secondary battery according to the second embodiment of the present disclosure including the preferable configurations described above, a positive electrode may be made from an electrode. In addition, in the secondary battery according to the second embodiment of the present disclosure including the preferable configurations and structures described above, the secondary battery is made from an air-metal secondary battery, and may be made from an air-lithium secondary battery. That is, lithium (Li) is contained in a negative electrode as a negative electrode active material.

In the methods for manufacturing an electrode according to the first to third embodiments of the present disclosure including the preferable configurations described above, a silicon component in the plant-derived material after the carbonization may be removed by a treatment with an acid or an alkali. An activating treatment may be performed before or after the treatment with an acid or an alkali.

X-ray photoelectron spectroscopy (XPS) (also referred to as electron spectroscopy for chemical analysis (ESCA)) is one of photoelectron spectroscopies. For example, using "Quntum 2000" manufactured by ULVAC-PHI, Inc., X-ray photoelectron spectroscopy may be performed based on measurement conditions such as excited X-ray: monochromatic Al Kα line, X-ray diameter: 200 μm, and photoelectron escape angle: 45° (slope of a detector with respect to a sample surface). Various elements can be analyzed, for example, by an energy dispersion method (EDS) using an energy dispersive X-ray analyzer (for example, JED-2200F manufactured by JEOL Ltd.). Measurement conditions may be set, for example, to a scanning voltage of 15 kV and an irradiation current of 10 μA.

As described above, a porous carbon material can be obtained by carbonizing a plant-derived material at 400° C. to 1400° C., then treating the plant-derived material with an acid or an alkali, and then heating the plant-derived material at a temperature higher than the temperature in the carbonization (method for manufacturing an electrode according to the first or second embodiment of the present disclosure). As described above, by performing the heat treatment at a temperature higher than the temperature in the carbonization, a kind of densification occurs in the porous carbon material. As a result, it is possible to provide a porous carbon material having more suitable pores (size, volume) for an electrode material. Before the heat treatment at a temperature higher than the temperature in the carbonization is performed (method for manufacturing an electrode according to the first or second embodiment of the present disclosure), or before an oxygen-containing functional group is removed from the surface of the porous carbon material (method for manufacturing an electrode according to the third embodiment of the present disclosure), pulverizing is preferably performed such that an average particle diameter is less than 4 µm, preferably 0.5 µm or less. Examples of the pulverizing method include a pulverizing method using a bead mill and a method using a ball mill or a jet mill.

Here, the carbonization generally means that an organic material (plant-derived material in the present disclosure) is converted into a carbonaceous material by a heat treatment (for example, refer to JIS M0104-1984). Examples of an atmosphere for the carbonization include an atmosphere in which oxygen is shut off. Specific examples thereof include a vacuum atmosphere, an inert gas atmosphere such as nitrogen gas or argon gas, and an atmosphere in which an organic material (plant-derived material) is brought into a kind of state of being steamed and baked.

A material obtained by carbonizing a plant-derived material at 400° C. to 1400° C. and before being treated with an acid or an alkali is referred to as "porous carbon material precursor" or "carbonaceous material." A material which can be obtained by carbonizing a plant-derived material at 400° C. to 1400° C. and then treating the plant-derived material with an acid or an alkali is referred to as, for convenience, "porous carbon material intermediate." Hereinafter, a method for manufacturing such a porous carbon material intermediate is sometimes referred to as "method for manufacturing a porous carbon material intermediate." Furthermore, the porous carbon material intermediate is preferably pulverized and further heated at a temperature higher than the temperature in the carbonization, or alternatively, an oxygen-containing functional group is removed from a surface of the porous carbon material to thereby obtain a material for an electrode or a porous carbon material.

There are differences depending on a plant-derived material to be used. However, before the plant-derived material is carbonized, the plant-derived material may be heated at a temperature lower than the temperature for the carbonization (for example, 400° C. to 700° C.) while oxygen is shut off. Such a heat treatment is referred to as "preliminary carbonization treatment." A tar component which will be generated during the carbonization can be thereby extracted. As a result, it is possible to reduce or remove the tar component which will be generated during the carbonization. The state in which oxygen is shut off can be obtained, for example, by making an inert gas atmosphere such as nitrogen gas or argon gas, making a vacuum atmosphere, or making the plant-derived material brought into a kind of state of being steamed and baked. There are differences depending on the plant-derived material to be used. However, in order to reduce a mineral component and water contained in the plant-derived material, and also to prevent the generation of an odor during the carbonization, the plant-derived material may be immersed in an alcohol (for example, methyl alcohol, ethyl alcohol, or isopropyl alcohol). Thereafter, the preliminary carbonization treatment may be performed. Examples of a material preferably subjected to the preliminary carbonization treatment in inert gas include a plant which generates much wood vinegar (tar or light oil). Examples of a material preferably subjected to a pretreatment with an alcohol include seaweed rich in iodine and various minerals.

In the method for manufacturing the porous carbon material intermediate, as described above, the plant-derived material is carbonized at 400° C. to 1400° C. Examples of an atmosphere for carbonization include an atmosphere in which oxygen is shut off. Specific examples thereof include a vacuum atmosphere, an inert gas atmosphere such as nitrogen gas or argon gas, and an atmosphere in which the plant-derived material is brought into a kind of state of being steamed and baked. A temperature rising rate to reach the carbonization temperature is not limited, but may be 1° C./min or more, preferably 3° C./min or more, more preferably 5° C./min or more in such an atmosphere. An upper limit of the carbonization time may be 10 hours, preferably 7 hours, more preferably 5 hours, but is not limited thereto. A lower limit of the carbonization time is only required to be a period of time during which the plant-derived material is surely carbonized. The plant-derived material may be pulverized, as desired, so as to have a desired particle size or may be classified. The plant-derived material may be washed in advance. Alternatively, the resulting porous carbon material precursor, porous carbon material intermediate, and porous carbon material may be pulverized, as desired, so as to have a desired particle size or may be classified. Alternatively, the porous carbon material intermediate or the porous carbon material after the activating treatment may be pulverized, as desired, so as to have a desired particle size or may be classified. The form, the configuration, and the structure of a furnace to be used for the carbonization are not limited. A continuous furnace or a batch furnace can be used.

Examples of an atmosphere in the heat treatment include an atmosphere in which oxygen is shut off. Specific examples thereof include a vacuum atmosphere, an inert gas atmosphere such as nitrogen gas or argon gas, and an atmosphere in which the porous carbon material intermediate is brought into a kind of state of being steamed and baked. A temperature rising rate to reach the temperature for the heat treatment is not limited, but may be 1° C./min or more, preferably 3° C./min or more, more preferably 5° C./min or more in such an atmosphere. A difference between the carbonization temperature and the temperature for the heat treatment may be appropriately determined by performing various tests. An upper limit of the heating time may be 10 hours, preferably 7 hours, more preferably 5 hours, but is not limited thereto. A lower limit of the heating time is only required to be a period of time during which desired properties can be imparted to the porous carbon material. The form, the configuration, and the structure of a furnace to be used for the heat treatment are not limited. A continuous furnace or a batch furnace can be used.

When an activating treatment is performed, it is possible to increase a micropore (described later) having a pore diameter of less than 2 nm. Examples of the activating treatment include a gas activating method and a chemical activating method. Here, in the gas activating method, the porous carbon material intermediate is heated, using oxygen, water vapor, carbon dioxide gas, or air as an activator, in such a gas atmosphere at 700° C. to 1400° C., preferably at 700° C. to 1000° C., more preferably at 800° C. to 1000° C., for several tens of minutes to several hours. A fine structure of volatile components and carbon molecules in the porous carbon material intermediate are thereby further developed. More specifically, the heating temperature in the activating treatment may be appropriately selected based on the type of the plant-derived material, the type and the concentration of the gas, and the like. In the chemical activating method, activation is performed using zinc chloride, iron chloride, calcium phosphate, calcium hydroxide, magnesium carbonate, potassium carbonate, sulfuric acid, or the like in place of oxygen or water vapor used in the gas activating method, washing is performed with hydrochloric acid, the pH is adjusted with an alkaline aqueous solution, and drying is performed.

By the treatment with an acid or an alkali, a silicon component in the plant-derived material after the carbonization is removed. Examples of the silicon component include a silicon oxide such as silicon dioxide, silicon oxide, or a salt of silicon oxide. In this way, by removing the silicon component in the plant-derived material after the carbonization, it is possible to obtain the porous carbon material having a high specific surface area. In some cases, the silicon component in the plant-derived material after the carbonization may be removed based on a dry etching method. That is, in a preferable configuration of the porous carbon material, a plant-derived material containing silicon (Si) is used as a raw material. When converted into a porous carbon material precursor or a carbonaceous material, the plant-derived material is carbonized at a high temperature (for example, 400° C. to 1400° C.). Silicon contained in the plant-derived material does not become silicon carbide (SiC), but becomes a silicon component (silicon oxide) such as silicon dioxide ($SiO_x$), silicon oxide, or a salt of silicon oxide. The silicon component (silicon oxide) contained in the plant-derived material before the carbonization does not substantially change even when the carbonization is performed at a high temperature (for example, 400° C. to 1400° C.) Therefore, by the treatment with an acid or an alkali (base) in the following step, the silicon component (silicon oxide) such as silicon dioxide, silicon oxide, or a salt of silicon oxide is removed. As a result, a large value of specific surface area by the nitrogen BET method can be obtained. Furthermore, the porous carbon material is a natural product-derived environment-compatible material. A microstructure thereof is obtained by treating the silicon component (silicon oxide) contained in advance in the raw material which is a plant-derived material with an acid or an alkali and removing the silicon component. Therefore, the arrangement of pores maintains a biological regularity in the plant.

As described above, the raw material of the porous carbon material is a plant-derived material. Here, examples of the plant-derived material include hull and straw of rice (paddy), barley, wheat, rye, barnyard grass, millet, and the like, coffee beans, tea-leaves (for example, leaves of green tea, black tea, and the like), sugarcanes (more specifically, bagasses of sugar canes), corn (more specifically, cobs of corn), fruit peels (for example, citrus peels such as orange peel, grapefruit peel, and mandarin orange peel, banana peel, and the like), reed, and stem seaweed. However, the plant-derived material is not limited thereto. Additional examples thereof include a terrestrial vascular plant, pteridophyte, bryophyte, algae, and sea grass. Each of these materials may be used alone or two or more kinds thereof may be mixed to be used as a raw material. The shape or the configuration of the plant-derived material is not particularly limited. The plant-derived material may be hull or straw itself, or may be a dried product. Furthermore, materials subjected to various treatments such as a fermentation treatment, a roasting treatment, and a extraction treatment, in food and drink processing of beer, Western liquor, and the like, can be also used. In particular, from a viewpoint of recycling industrial waste, straw or hull after processing such as threshing is preferably used. The straw or hull after processing is easily available, for example, from an agricultural cooperative, a liquor manufacturing company, a food company, or a food processing company in a large amount.

The porous carbon material includes many pores. The pore includes a "mesopore" having a pore diameter of 2 nm to 50 nm, a "micropore" having a pore diameter of less than 2 nm, and a "macropore" having a pore diameter of more than 50 nm. In the porous carbon material, the pore volume by the BJH method is 0.1 cm$^3$/g or more, preferably 0.2 cm$^3$/g or more, more preferably 0.3 cm$^3$/g or more, still more preferably 0.5 cm$^3$/g or more. The pore volume by the MP method is also 0.1 cm$^3$/g or more, preferably 0.2 cm$^3$/g or more, more preferably 0.3 cm$^3$/g or more, still more preferably 0.5 cm$^3$/g or more. The micropores include many pores having a pore diameter of about 1.9 nm, many pores having a pore diameter of about 1.5 nm, and many pores having a pore diameter of about 0.8 nm to 1 nm.

In the nitrogen BET method, by allowing nitrogen serving as adsorbed molecules to be adsorbed and desorbed on an adsorbent (here, the porous carbon material), an adsorption isotherm is measured, and the measured data is analyzed by the BET formula represented by formula (1). The specific surface area, the pore volume, and the like can be calculated based on this method. Specifically, when a value of the specific surface area is calculated by the nitrogen BET method, first, by allowing nitrogen serving as adsorbed molecules to be adsorbed and desorbed on the porous carbon material, the adsorption isotherm is determined. Then, from the obtained adsorption isotherm, $[p/\{V_a(p_0-p)\}]$ is calculated based on formula (1) or formula (1') obtained by modifying formula (1), and is plotted with respect to an equilibrium relative pressure ($p/p_0$). Then, this plot is assumed to be a straight line. A slope s ($=[(C-1)/(C \cdot V_m)]$) and an intercept i ($=[1/(C \cdot V_m)]$) are calculated based on a least-squares method. Then, $V_m$ and C are calculated based on formulae (2-1) and (2-2) from the obtained slope s and intercept i. Furthermore, a specific surface area $a_{sBET}$ is calculated based on formula (3) from $V_m$ (refer to Manual of BELSORP-mini and BELSORP analysis software manufactured by Bell Japan, Inc., pages 62 to 66). This nitrogen BET method is in conformity with JIS R 1626-1996 "Measuring methods for the specific surface area of fine ceramic powders by gas adsorption using the BET method."

$$V_a=(V_m \cdot C \cdot p)/[(p_0-p)\{1+(C-1)(p/p_0)\}] \quad (1)$$

$$[p/\{V_a(p_0-p)\}]=[(C-1)/(C \cdot V_m)](p/p_0)+[1/(C \cdot V_m)] \quad (1')$$

$$V_m=1/(s+i) \quad (2\text{-}1)$$

$$C=(s/i)+1 \quad (2\text{-}2)$$

$$a_{sBET}=(V_m \cdot L \cdot \sigma)/22414 \quad (3)$$

Here, the symbols are defined as follows.
$V_a$: amount of adsorption
$V_m$: amount of adsorption of a monomolecular layer
p: equilibrium pressure of nitrogen
$p_0$: saturated vapor pressure of nitrogen
L: Avogadro's number
σ: adsorption cross sectional area of nitrogen When a pore volume $V_p$ is calculated by the nitrogen BET method, for example, the obtained adsorption data of the adsorption isotherm is subjected to linear interpolation to determine an amount of adsorption V at a relative pressure set with a pore volume calculation relative pressure. The pore volume $V_p$ can be calculated based on formula (4) from the amount of adsorption V (refer to Manual of BELSORP-mini and BELSORP analysis software manufactured by Bell Japan, Inc., pages 62 to 65). Hereinafter, the pore volume based on the nitrogen BET method is sometimes simply referred to as "pore volume".

$$V_p=(V/22414) \times (M_g/\rho_g) \quad (4)$$

Here, the symbols are defined as follows.
V: amount of adsorption at a relative pressure
$M_g$: molecular weight of nitrogen
$\rho_g$: density of nitrogen The pore diameter of the mesopore can, for example, be calculated as a distribution of pores from a rate of change in pore volume with respect to the pore diameter thereof based on the BJH method. The BJH method is widely used as a pore distribution analysis method. When the pore distribution analysis is performed based on the BJH method, first, by allowing nitrogen serving as adsorbed molecules to be adsorbed and desorbed on the porous carbon material, the desorption isotherm is obtained. Then, based on the obtained desorption isotherm, the thickness of the adsorption layer when adsorbed molecules (for example, nitrogen) are desorbed stepwise from a state in which the pores are filled with the adsorbed molecules, and an inner diameter (twice a core radius) of a pore generated at this time are determined. The pore radius $r_p$ is calculated based on formula (5) to calculate the pore volume based on formula (6). Then, by plotting the rate of change in pore volume ($dV_p/dr_p$) with respect to the pore diameter ($2r_p$) from the pore radius and the pore volume, a pore distribution curve is obtained (refer to Manual of BELSORP-mini and BELSORP analysis software manufactured by Bell Japan, Inc., pages 85 to 88).

$$r_p = t + r_k \tag{5}$$

$$V_{pn} = R_n \cdot dV_n - R_n \cdot dt_n \cdot c \cdot \Sigma A_{pj} \tag{6}$$

Here, $$R_n = r_{pn}^2 / (r_{kn-1} + dt_n)^2 \tag{7}$$

Here, the symbols are defined as follows.
$r_p$: pore radius
$r_k$: core radius (inner diameter/2) when an adsorption layer having a thickness of t is adsorbed on an inner wall of a pore having a pore radius of $r_p$ at that pressure
$V_{pn}$: pore volume when the n-th desorption of nitrogen has occurred
$dV_n$: amount of change at that time
$dt_n$: amount of change in the thickness $t_n$ of the adsorption layer when the n-th desorption of nitrogen has occurred
$r_{kn}$: core radius at that time
c: fixed value
$r_{pn}$: pore radius when the n-th desorption of nitrogen has occurred $\Sigma A_{pj}$ represents an integrated value of an area of a wall surface of a pore of j=1 to j=n-1.

The pore diameter of the micropore can, for example, be calculated as a distribution of pores from a rate of change in pore volume with respect to the pore diameter thereof based on the MP method. When the pore distribution analysis is performed based on the MP method, first, by allowing nitrogen to be adsorbed on the porous carbon material, the adsorption isotherm is determined. Subsequently, the adsorption isotherm is converted into a pore volume with respect to the thickness t of the adsorption layer (plotted with respect to t). Then, a pore distribution curve can be obtained based on the curvature of the plot (the amount of change in pore volume with respect to the amount of change in the thickness t of the adsorption layer) (refer to Manual of BELSORP-mini and BELSORP analysis software manufactured by Bell Japan, Inc., pages 72, 73, and 82).

The porous carbon material precursor is treated with an acid or an alkali. Specific examples of the treatment method include a method in which the porous carbon material precursor is immersed in an acid or alkali aqueous solution and a method in which the porous carbon material precursor is reacted with an acid or an alkali in a vapor phase. More specifically, when the treatment is performed with an acid, examples of the acid include a fluorine compound exhibiting acidity, such as hydrogen fluoride, hydrofluoric acid, ammonium fluoride, calcium fluoride, or sodium fluoride. When a fluorine compound is used, the amount of fluorine element is only required to be four times the amount of silicon element in the silicon component contained in the porous carbon material precursor. A concentration of the fluorine compound aqueous solution is preferably 10% by mass or more. When the silicon component (for example, silicon dioxide) contained in the porous carbon material precursor is removed with hydrofluoric acid, silicon dioxide is reacted with hydrofluoric acid as shown in chemical formula (A) or (B), and is removed as hexafluorosilicic acid ($H_2SiF_6$) or silicon tetrafluoride ($SiF_4$). The porous carbon material intermediate can be thereby obtained. Thereafter, washing and drying may be performed.

$$SiO_2 + 6HF \rightarrow H_2SiF_6 + 2H_2O \tag{A}$$

$$SiO_2 + 4HF \rightarrow SiF_4 + 2H_2O \tag{B}$$

When the treatment is performed with an alkali (base), examples of the alkali include sodium hydroxide. When an alkali aqueous solution is used, the pH of the aqueous solution is only required to be 11 or more. When the silicon component (for example, silicon dioxide) contained in the porous carbon material precursor is removed with a sodium hydroxide aqueous solution, the sodium hydroxide aqueous solution is heated, and silicon dioxide is thereby reacted as shown in chemical formula (C) and is removed as sodium silicate ($Na_2SiO_3$). The porous carbon material intermediate can be obtained. When the treatment is performed by reacting sodium hydroxide in a vapor phase, solid sodium hydroxide is heated, and a reaction thereby occurs as shown in chemical formula (C). Removal as sodium silicate ($Na_2SiO_3$) occurs, and the porous carbon material intermediate can be obtained. Thereafter, washing and drying may be performed.

$$SiO_2 + 2NaOH \rightarrow Na_2SiO_3 + H_2O \tag{C}$$

An average particle diameter of the porous carbon material can be measured by the following method. That is, 0.6 g of a sample is added to 400 g of a 30% by mass sodium peroxodisulfate aqueous solution. The resultant mixture is sufficiently stirred at 24° C., and then ultrasonic waves are applied thereto for three hours while the solution is maintained at 40° C. Thereafter, the resulting mixture is subjected to centrifugation. The liquid phase is taken out therefrom, water is added thereto, and ultrasonic cleaning is performed twice. Thereafter, the resulting solid phase is dispersed in water, and the particle diameter is measured using the zeta potential-particle diameter measurement system ELSZ-2 manufactured by Otsuka Electronics Co., Ltd. In the measurement of the particle diameter, specifically, the particles dispersed in the solution are irradiated with a laser beam, and the measurement is performed based on a dynamic light scattering method for observing the scattered light with a photon detector. When the concentration is high, the measurement is performed by suitably diluting the solution.

The average particle diameter of the porous carbon material included in an electrode, that is, the average particle diameter of the porous carbon material serving as the electrode can be obtained by observation using a scanning electron microscope (SEM). Alternatively, the porous carbon material is peeled off from the electrode, and the measurement can be performed using the obtained sample by the following method. That is, the sample is put into N-methyl-2-pyrrolidone (NMP) and stirred at 200° C. for three hours. Thereafter, the resultant mixture is dried at 300° C. for 48 hours in a nitrogen atmosphere. Subsequently, 0.6 g of the sample is added to 400 g of a 30% by mass sodium peroxodisulfate aqueous solution, and the resultant mixture is sufficiently stirred at 24° C. Thereafter, ultrasonic waves are applied thereto for three hours while the solution is maintained at 40° C. The above operations are performed multiple times as necessary. Thereafter, centrifugation is performed, the liquid phase is taken out therefrom, water is added thereto, and ultrasonic cleaning is performed twice. Thereafter, the resulting solid phase is dispersed in water, and the particle diameter is measured using ELSZ-2 manufactured by Otsuka Electronics Co., Ltd.

The secondary battery of the present disclosure, for example, can be incorporated into an electronic device. The electronic device may be of any type basically, and includes both a portable type and a stationary type. Specific examples of the electronic device include a portable phone, a mobile device, a robot, a personal computer, a game machine, a camera-integrated VTR (video tape recorder), an on-vehicle device, various household electrical appliances, and an industrial product.

Example 1

Example 1 relates to the electrodes and the secondary batteries according to the first and second embodiments of the present disclosure, and the methods for manufacturing an electrode according to the first to third embodiments of the present disclosure. Here, the secondary battery of Example 1 is made specifically from an air-metal secondary battery, more specifically from an air-lithium secondary battery. A positive electrode is made from an electrode. That is, lithium (Li) is contained in a negative electrode as a negative electrode active material.

The electrode of Example 1 includes a plant-derived porous carbon material. The secondary battery of Example 1 includes an electrode containing a plant-derived porous carbon material. When a peak area of an O(1s) spectrum of the porous carbon material obtained by X-ray photoelectron spectroscopy is defined as $P_O$, and a peak area of a C(1s) spectrum thereof is defined as $P_C$, $P_O/P_C \leq 0.05$, preferably $P_O/P_C \leq 0.01$. Alternatively, an oxygen-containing functional group has been removed from the surface of the porous carbon material.

Here, the porous carbon material of Example 1 has a value of specific surface area by the nitrogen BET method of 100 $m^2/g$ or more, a pore volume by the BJH method of 0.1 $cm^3/g$ or more, and a pore volume by the MP method of 0.1 $cm^3/g$ or more. The porous carbon material of Example 1 includes a plant-derived material having a silicon (Si) content of 5% by mass or more as a raw material. That is, the silicon (Si) content in the raw material (plant-derived material before the carbonization) is 5% by mass or more. The silicon (Si) content in the plant-derived porous carbon material is less than 5% by mass.

In Example 1, using hull which was a plant-derived material having a silicon (Si) content of 5% by mass or more as a raw material, carbonization (firing) was performed at 400° C. to 1400° C., specifically, at 800° C. in a nitrogen atmosphere to obtain a porous carbon material precursor. Subsequently, the obtained porous carbon material precursor was treated with an acid or an alkali. Specifically, an acid treatment was performed by immersing the obtained porous carbon material precursor overnight in a 48% by volume hydrofluoric acid aqueous solution, and a silicon component in the plant-derived material after the carbonization was removed. Thereafter, washing was performed with water and ethyl alcohol until the pH reached 7. Then drying was performed to obtain a porous carbon material intermediate.

Thereafter, the temperature of the porous carbon material intermediate was raised to 900° C. in a nitrogen atmosphere, and an activating treatment with water vapor (use amount: 5 L/min) was performed for three hours. Subsequently, the resulting porous carbon material intermediate was mixed with ethyl alcohol, and pulverized using a jet mill to obtain a 4 µm passed product (porous carbon material intermediate having a diameter of 4 µm or less). Thereafter, the 4 µm passed product was subjected to a heat treatment at a temperature higher than the temperature in the carbonization (specifically 800° C.). Specifically, in order to perform the heat treatment, the temperature was raised at 5° C./min until reaching 1400° C., and then maintained at 1400° C. for one hour, in a nitrogen atmosphere. Alternatively, an oxygen-containing functional group was removed from the surface of the porous carbon material. In this way, it was possible to obtain the porous carbon material of Example 1.

The 4 µm passed product before being subjected to the heat treatment at a temperature higher than the temperature in the carbonization was referred to as a porous carbon material of "Comparative Example 1A." The porous carbon material obtained by immersing the porous carbon material of Comparative Example 1A in nitric acid to oxidize a surface thereof, and attaching a functional group to the surface intentionally was referred to as "Comparative Example 1B."

These porous carbon materials were classified using a sieve having a mesh opening of 75 µm to obtain a 75 µm passed product. Table 1 shows values of the BET specific surface area (expressed by a unit of $m^2/g$ and "specific surface area" in Table 1), the total pore volume by the BET method (expressed by a unit of $cm^3/g$ and "total pore volume" in Table 1), the pore volume by the BJH method (expressed by a unit of $cm^3/g$ and "BJH method" in Table 1), and the pore volume by the MP method (expressed by a unit of $cm^3/g$ and "MP method" in Table 1), of Example 1 and Comparative Examples 1A and 1B.

TABLE 1

|  | Specific surface area | Total pore volume | BJH method | MP method |
| --- | --- | --- | --- | --- |
| Example 1 | 1550 | 1.37 | 0.93 | 0.62 |
| Comparative Example 1A | 1570 | 1.29 | 0.83 | 0.65 |
| Comparative | 1640 | 1.27 | 0.78 | 0.76 |

Example 1B

In each of Example 1 and Comparative Examples 1A and 1B, an electrode was manufactured based on the following method. That is, 0.292 g of the porous carbon material or the like of each of Example 1 and Comparative Examples 1A and 1B shown in Table 1, 0.052 g of polyvinylidene fluoride (PVDF), and 1 mL of N-methyl-2-pyrrolidone (NMP) solvent were mixed and kneaded. Here, PVDF functions as a binder. A paste obtained in this way was applied to a gas diffusion layer (substrate) made of carbon paper. After drying was sufficiently performed at 120° C., drying under vacuum was performed at 100° C. overnight. Thereafter, by performing a punching process so as to have a diameter of 15 mm, a positive electrode for an air-lithium secondary battery was obtained.

Subsequently, by using the positive electrode thus obtained, an air-lithium secondary battery made from a 2016 type coin battery was assembled. Specifically, the positive electrode, an electrolyte, and a negative electrode made of lithium foil having a thickness of 0.8 mm were stacked to assemble an air-lithium secondary battery made from the 2016 type coin battery. As the electrolyte, specifically, 40 microliters of a mixture of lithium bistrifluoromethanesulfonylimide [LiTSFI, $(CF_3SO_2)_2NLi$] and tetraethylene glycol dimethyl ether (TEGDME) (molar ratio 1/4) were used. As a separator, a glass fiber separator having a thickness of 200 μm was used.

Conditions of a charge-discharge test of the air-lithium secondary battery were as follows. That is, as discharge conditions, in the secondary battery of Example 1, 2.0 V as a cut-off voltage and 100 (mA/g of positive electrode) as a discharge current value were used. As charge conditions, 4.7 V as a cut-off voltage and 100 (mA/g of positive electrode) as a charge current value were used.

Figure 1B:
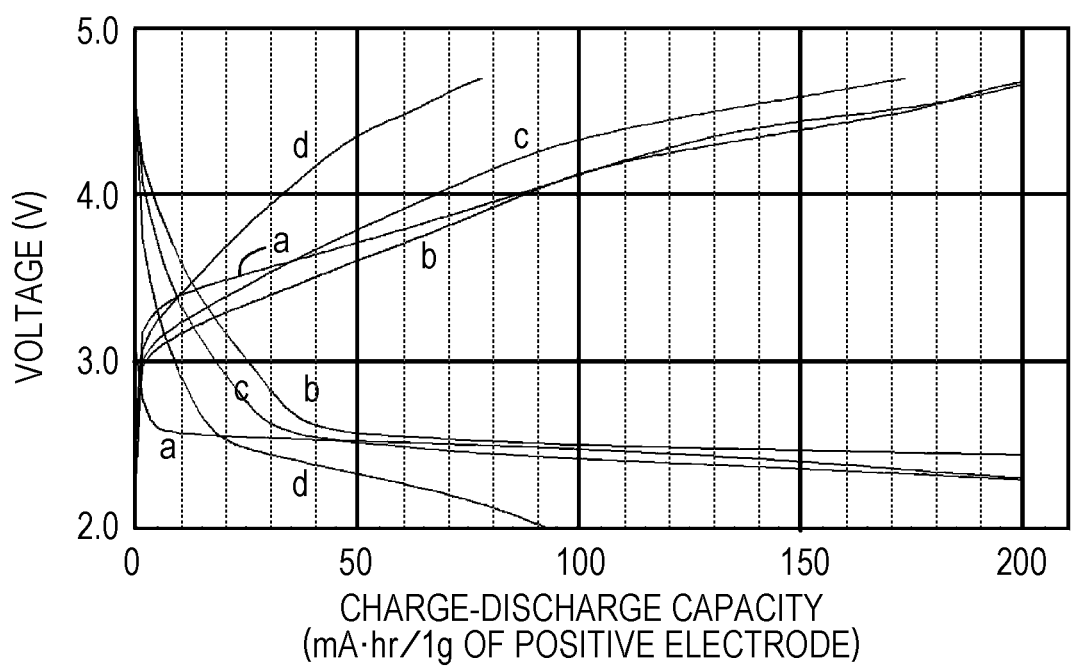
Figure 2A:
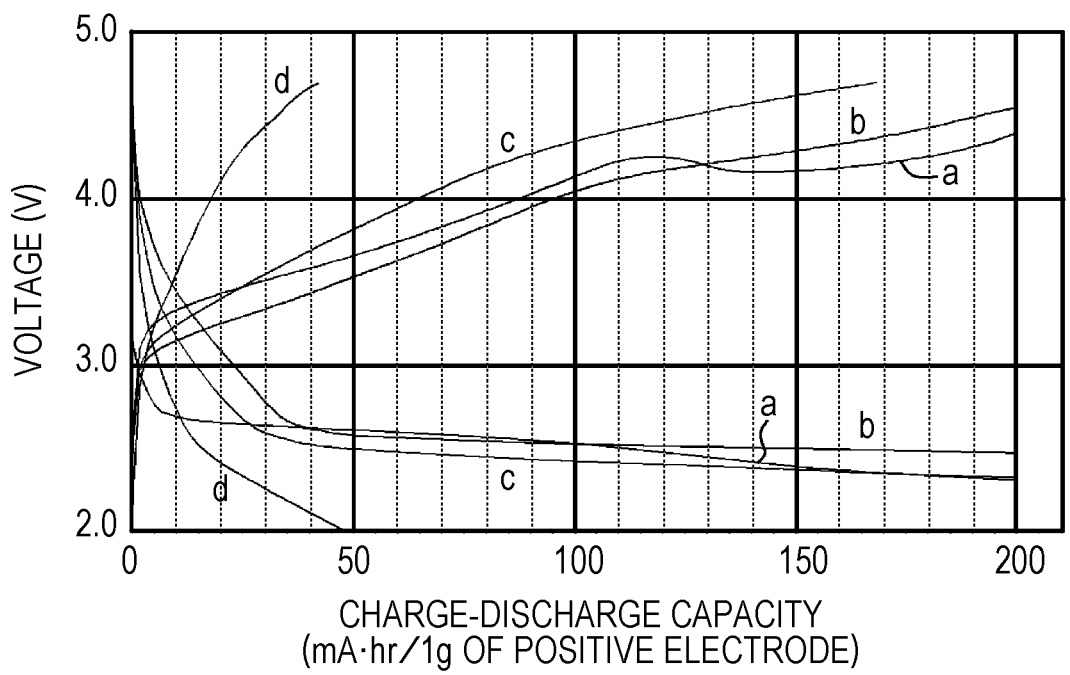
FIG. 2A is a graph illustrating charge-discharge curves in the first cycle (first time), the tenth cycle, the fifteenth cycle, and the twentieth cycle of the secondary battery in Comparative Example 1B.
Figure 2B:
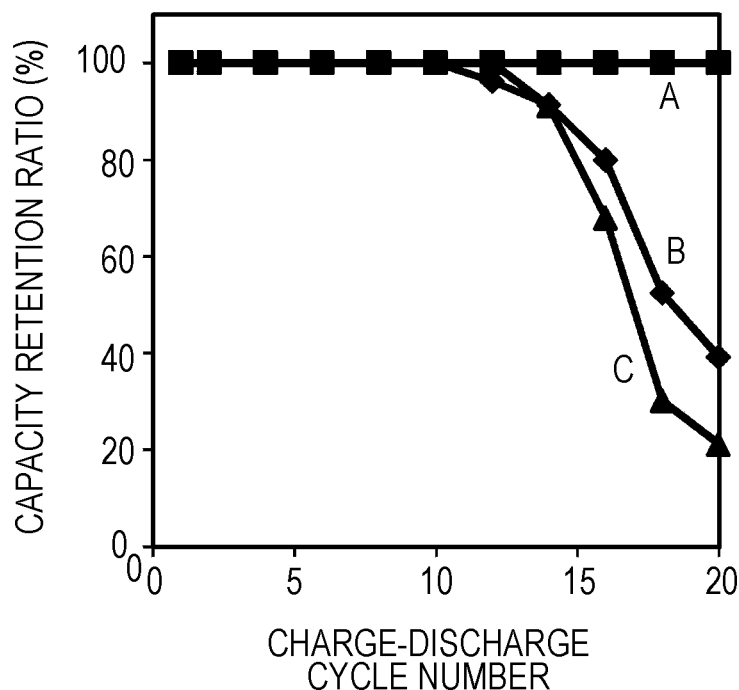
FIG. 2B is a graph of a cycle number and a capacity retention ratio.
Figure 3:
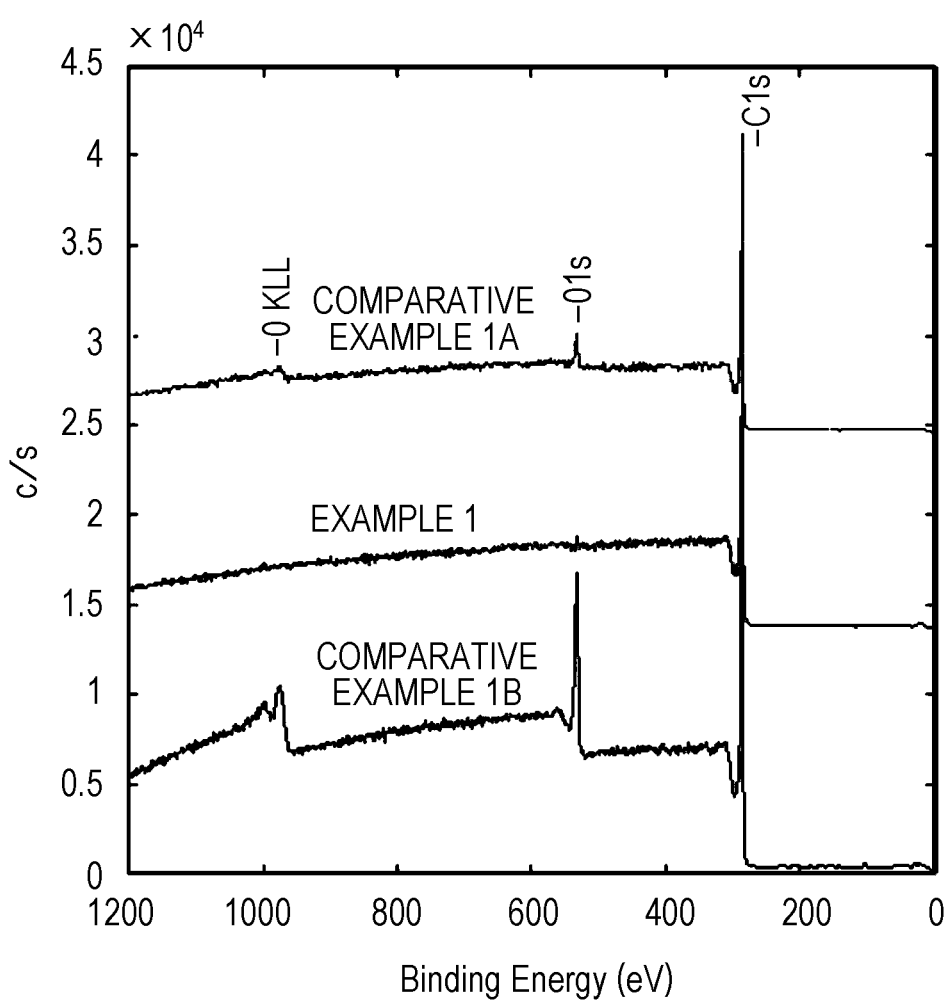
FIG. 3 is a graph illustrating results of a wide-scan spectrum measurement of porous carbon materials in Example 1 and Comparative Examples 1A and 1B.
Figure 4:
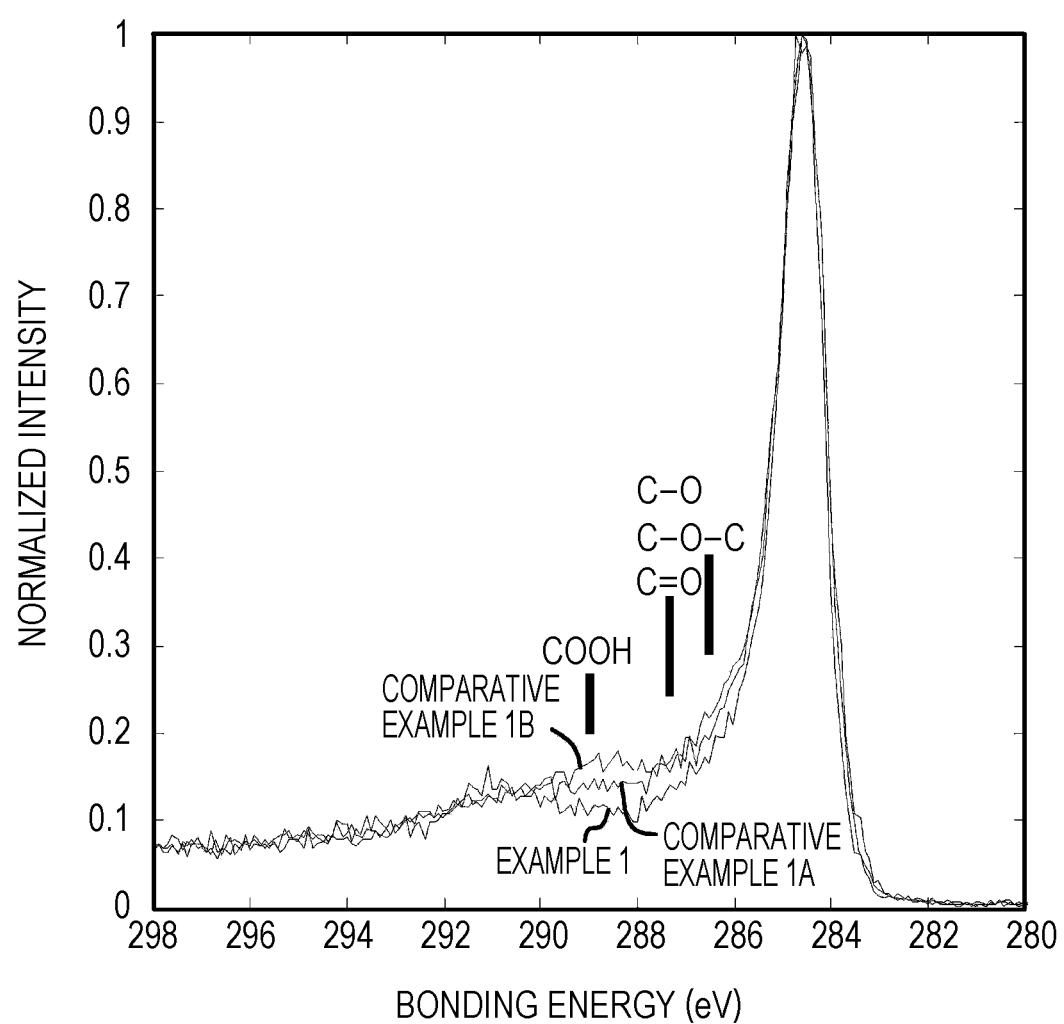
FIG. 4 is a graph illustrating normalized spectra of C(1s) of the porous carbon materials in Example 1 and Comparative Examples 1A and 1B obtained by X-ray photoelectron spectroscopy.

Each of FIG. 1A (Example 1), FIG. 1B (Comparative Example 1A), and FIG. 2A (Comparative Example 1B) illustrates charge-discharge curves in the first cycle (first time), the tenth cycle, the fifteenth cycle, and the twentieth cycle of the obtained air-lithium secondary battery. The horizontal axis in each of FIG. 1A, FIG. 1B, and FIG. 2A indicates a charge-discharge capacity (value per 1 gram of positive electrode, unit: mA·hour) and the vertical axis indicates a voltage (unit: volt). In the charge-discharge curves in FIG. 1A, FIG. 1B, and FIG. 2A, the curves shown in an upper side are charge curves, and the curves shown in a lower side are discharge curves. In FIG. 1A, FIG. 1B, and FIG. 2A, the curve "a" indicates the charge-discharge curve in the first cycle (first time), the curve "b" indicates the charge-discharge curve in the 10th cycle, the curve "c" indicates the charge-discharge curve in the 15th cycle, and the curve "d" indicates the charge-discharge curve in the 20th cycle. However, in FIG. 1A, the charge-discharge curves in the 10th, 15th, and 20th cycles are almost overlapped. A graph of a cycle number and a capacity retention ratio is illustrated in FIG. 2B. The capacity retention ratios in the 20th cycle in Example 1 and Comparative Examples 1A and 1B are shown below. Here, the capacity retention ratio is defined as {(discharge capacity in the Nth cycle)/ (discharge capacity in the first cycle)×100%}. Furthermore, wide-scan spectrum measurement results of the porous carbon materials in Example 1 and Comparative Examples 1A and 1B are shown in FIG. 3. Normalized spectra of C (1s) obtained by X-ray photoelectron spectroscopy are shown in FIG. 4. O(1s) spectra obtained by X-ray photoelectron spectroscopy are shown in FIG. 5. Here, in FIG. 2B, "A" indicates data of Example 1, "B" indicates data of Comparative Example 1A, and "C" indicates data of the Comparative Example 1B. Furthermore, elemental concentrations obtained from these analysis results (unit: atomic percent) and values of $P_O/P_C$ are shown in Table 2 below. From the analysis results, the oxygen-containing functional group is considered to be a carboxy group, a lactone group, a phenol group, a carbonyl group, an ether group, a quinone group, or a hydroxyl group.

| | |
|---|---|
| Example 1 | 98% |
| Comparative Example 1A | 39% |
| Comparative Example 1B | 21% |

Data of the porous carbon materials in Example 1 and Comparative Example 1A obtained by X-ray photoelectron spectroscopy are also shown in Table 2.

TABLE 2

| | C | N | O | Si | $P_O/P_C$ |
|---|---|---|---|---|---|
| Example 1 | 99.3 | not detected | 0.6 | 0.1 | 0.006 |
| Comparative Example 1B | 85.3 | 0.6 | 13.9 | 0.2 | 0.16 |
| Comparative Example 1A | 94.2 | not detected | 5.4 | 0.4 | 0.06 |

From FIGS. 1A, 1B, 2A, and 2B, in the secondary battery of Example 1, even when the charge-discharge cycle number became 20, deterioration in the charge-discharge cycle characteristics was not observed. From analysis results of FIGS. 3, 4, and 5, and Table 2, a clear difference was observed in the value of $P_O/P_C$ between Example 1 and Comparative Examples 1A and 1B. From these results, it was found that it was possible to obtain a secondary battery having excellent charge-discharge cycle characteristics by removing an oxygen-containing functional group from the surface of the porous carbon material, or by reducing the value of $P_O/P_C$.

Hitherto, the present disclosure has been described based on preferable Examples. However, the present disclosure is not limited to these Examples, and various modifications thereof are possible. The raw materials and manufacturing conditions of the porous carbon material in Examples are illustrative, and can be changed as appropriate. In Example 1, the oxygen-containing functional group was removed by firing at 1400° C. However, the oxygen-containing functional group may be removed by another method. Specific examples of other removing methods include a chemical reduction method using a reducing agent such as hydrogen gas, an electrochemical method of applying a reduction potential, a photoelectrochemical method for reduction through a photocatalyst using light energy, a biological method for reduction with a reaction of a bacteria, an enzyme, or the like, and an optical method for reduction using an electromagnetic wave.

In Examples, a case where hull was used as a raw material of the porous carbon material was described. However, other plants may be used as a raw material. Here, examples of other plants include, straw, reed, stem seaweed, a terrestrial vascular plant, pteridophyte, bryophyte, algae, and sea grass. Each of these may be used alone, or a multiple kinds thereof may be mixed and used. Specifically, for example, straw of paddy (for example, Isehikari produced in Kagoshima) is used as a plant-derived material serving as a raw material of the porous carbon material. The porous carbon material is converted into a carbonaceous material (porous carbon material precursor) by carbonizing the straw serving as a raw material. Subsequently, an acid treatment is performed to obtain a porous carbon material intermediate. Alternatively, reed of Gramineae is used as a plant-derived material serving as a raw material of the porous carbon material. The reed of Gramineae serving as the raw material is carbonized and converted into a carbonaceous material (porous carbon material precursor). Subsequently, an acid treatment is performed to obtain a porous carbon material intermediate. Also in the porous carbon material obtained by treating with an alkali (base) such a sodium hydroxide aqueous solution in place of the hydrofluoric acid aqueous solution, similar results were obtained.

Alternatively, stem seaweed (produced in Sanriku in Iwate prefecture) is used as a plant-derived material serving as a raw material of the porous carbon material. The stem seaweed serving as the raw material is carbonized and converted into a carbonaceous material (porous carbon material precursor). Subsequently, an acid treatment is performed to obtain a porous carbon material intermediate. Specifically, first, for example, stem seaweed is subjected to a preliminary carbonization treatment to be heated and carbonized at a temperature of about 500° C. Before being heated, for example, stem seaweed serving as a raw material may be treated with an alcohol. Specific examples of the treatment method include a method of immersing the stem seaweed in ethyl alcohol or the like. It is thereby possible to reduce water contained in the raw material, and also to elute elements other than carbon and mineral components contained in the finally obtained porous carbon material. In addition, by the treatment with an alcohol, it is possible to suppress generation of gas during the carbonization. More specifically, stem seaweed is immersed in ethyl alcohol for 48 hours. An ultrasonic treatment is preferably performed in ethyl alcohol. Subsequently, the stem seaweed is heated at 500° C. for five hours in a nitrogen gas stream, and is thereby carbonized to obtain a carbide. By performing such a preliminary carbonization treatment, it is possible to reduce or eliminate a tar component which will be generated during the carbonization in a following step. Thereafter, 10 g of the carbide is put in an alumina crucible. The temperature thereof is raised to 1000° C. at a heating rate of 5° C./min in a nitrogen gas stream (10 L/min). The carbide was converted into a carbonaceous material (porous carbon material precursor) by carbonization at 1000° C. for five hours. Thereafter, the temperature thereof is cooled to room temperature. Nitrogen gas continuously flows during the carbonization and cooling. Subsequently, the porous carbon material precursor is treated with an acid by immersing the resulting precursor overnight in a 46% by volume hydrofluoric acid aqueous solution. Thereafter, washing is performed with water and ethyl alcohol until the pH reaches 7, and drying is performed to obtain a porous carbon material intermediate.

The present disclosure may include the following configurations.

[A01] <<Electrode: First Embodiment>>

An electrode including a plant-derived porous carbon material, when a peak area of an O(1s) spectrum of the porous carbon material obtained by X-ray photoelectron spectroscopy is defined as $P_O$, and a peak area of a C(1s) spectrum thereof is defined as $P_C$, $P_O/P_C \leq 0.05$, preferably $P_O/P_C \leq 0.01$ being satisfied.

[A02] <<Electrode: Second Embodiment>>

An electrode including a plant-derived porous carbon material, from the surface of which an oxygen-containing functional group has been removed.

[A03] The electrode according to [A02], the oxygen-containing functional group being a carboxy group, a lactone group, a phenol group, a carbonyl group, an ether group, a quinone group, or a hydroxyl group.

[A04] The electrode according to any one of [A01] to [A03], the porous carbon material having a value of specific surface area by the nitrogen BET method of 100 $m^2/g$ or more, a pore volume by the BJH method of 0.1 $cm^3/g$ or more, and a pore volume by the MP method of 0.1 $cm^3/g$ or more.

[A05] The electrode according to any one of [A01] to [A04], the porous carbon material including a plant-derived material having a silicon content of 5% by mass or more as a raw material.

[B01] <<Secondary Battery: First Embodiment>>

A secondary battery including an electrode containing a plant-derived porous carbon material, when a peak area of an O(1s) spectrum of the porous carbon material obtained by X-ray photoelectron spectroscopy is defined as $P_O$, and a peak area of a C(1s) spectrum thereof is defined as $P_C$, $P_O/P_C \leq 0.05$, preferably $P_O/P_C \leq 0.01$ being satisfied.

[B02] <<Secondary Battery: Second Embodiment>>

A secondary battery including an electrode containing a plant-derived porous carbon material, from the surface of which an oxygen-containing functional group has been removed.

[B03] The secondary battery according to [B02], the oxygen-containing functional group being a carboxy group, a lactone group, a phenol group, a carbonyl group, an ether group, a quinone group, or a hydroxyl group.

[B04] The secondary battery according to any one of [B01] to [B03], the porous carbon material having a value of specific surface area by the nitrogen BET method of 100 $m^2/g$ or more, a pore volume by the BJH method of 0.1 $cm^3/g$ or more, and a pore volume by the MP method of 0.1 $cm^3/g$ or more.

[B05] The secondary battery according to any one of [B01] to [B04], the porous carbon material including a plant-derived material having a silicon content of 5% by mass or more as a raw material.

[B06] The secondary battery according to any one of [B01] to [B05], a positive electrode being made from the electrode.

[B07] The secondary battery according to [B06], made from an air-metal secondary battery.

[B08] The secondary battery according to [B07], made from an air-lithium secondary battery.

[C01] <<Method for Manufacturing Electrode: First Embodiment>>

A method for manufacturing an electrode including a plant-derived porous carbon material, when a peak area of an O(1s) spectrum of the porous carbon material obtained by X-ray photoelectron spectroscopy is defined as $P_O$, and a peak area of a C(1s) spectrum thereof is defined as $P_C$, $P_O/P_C \leq 0.05$, preferably $P_O/P_C \leq 0.01$ being satisfied, the porous carbon material being obtained by carbonizing the plant-derived material at 400° C. to 1400° C., then treating the plant-derived material with an acid or an alkali, and then heating the plant-derived material at a temperature higher than the temperature in the carbonization.

[C02] <<Method for Manufacturing Electrode: Second Embodiment>>

A method for manufacturing an electrode including a plant-derived porous carbon material from a surface of which an oxygen-containing functional group has been removed, the porous carbon material being obtained by carbonizing the plant-derived material at 400° C. to 1400° C., then treating the plant-derived material with an acid or an alkali, and then heating the plant-derived material at a temperature higher than the temperature in the carbonization.

[C03] <<Method for Manufacturing Electrode: Third Embodiment>>

A method for manufacturing an electrode including a plant-derived porous carbon material from a surface of which an oxygen-containing functional group has been removed, the porous carbon material being obtained by carbonizing the plant-derived material at 400° C. to 1400° C., then treating the plant-derived material with an acid or an alkali, and then removing an oxygen-containing functional group from a surface of the porous carbon material.

[C04] The method for manufacturing an electrode according to [C02] or [C03], the oxygen-containing functional group being a carboxy group, a lactone group, a phenol group, a carbonyl group, an ether group, a quinone group, or a hydroxyl group.

[C05] The method for manufacturing an electrode according to any one of [C01] to [C04], the porous carbon material having a value of specific surface area by the nitrogen BET method of 100 m$^2$/g or more, a pore volume by the BJH method of 0.1 cm$^3$/g or more, and a pore volume by the MP method of 0.1 cm$^3$/g or more.

[C06] The method for manufacturing an electrode according to any one of [C01] to [C05], the porous carbon material including a plant-derived material having a silicon content of 5% by mass or more as a raw material.

[C07] The method for manufacturing an electrode according to any one of [C01] to [C06], a silicon component in the plant-derived material after the carbonization being removed by a treatment with an acid or an alkali.

[D01] <<Porous Carbon Material . . . First Embodiment>>

A plant-derived porous carbon material used for an electrode, when a peak area of an O(1s) spectrum of the porous carbon material obtained by X-ray photoelectron spectroscopy is defined as $P_O$, and a peak area of a C (1s) spectrum thereof is defined as $P_C$, $P_O/P_C \leq 0.05$, preferably $P_O/P_C \leq 0.01$ being satisfied.

[D02] <<Porous Carbon Material . . . Second Embodiment>>

A plant-derived porous carbon material used for an electrode, from a surface of which an oxygen-containing functional group has been removed.

[D03] The porous carbon material according to [D02], the oxygen-containing functional group being a carboxy group, a lactone group, a phenol group, a carbonyl group, an ether group, a quinone group, or a hydroxyl group.

[D04] The porous carbon material according to any one of [D01] to [D03], having a value of specific surface area by the nitrogen BET method of 100 m$^2$/g or more, a pore volume by the BJH method of 0.1 cm$^3$/g or more, and a pore volume by the MP method of 0.1 cm$^3$/g or more.

[D05] The porous carbon material according to any one of [D01] to [D04], including a plant-derived material having a silicon content of 5% by mass or more as a raw material.

[E01] <<Method for Manufacturing Porous Carbon Material . . . First Embodiment>>

A method for manufacturing a plant-derived porous carbon material used for an electrode, when a peak area of an O(1s) spectrum of the porous carbon material obtained by X-ray photoelectron spectroscopy is defined as $P_O$, and a peak area of a C(1s) spectrum thereof is defined as $P_C$, $P_O/P_C \leq 0.05$, preferably $P_O/P_C \leq 0.01$ being satisfied, the method including carbonizing a plant-derived material at 400° C. to 1400° C., then treating the plant-derived material with an acid or an alkali, and then heating the plant-derived material at a temperature higher than the temperature in the carbonization.

[E02] <<Method for Manufacturing Porous Carbon Material: Second Embodiment>>

A method for manufacturing a plant-derived porous carbon material used for an electrode, from a surface of which an oxygen-containing functional group has been removed, including carbonizing the plant-derived material at 400° C. to 1400° C., then treating the plant-derived material with an acid or an alkali, and then heating the plant-derived material at a temperature higher than the temperature in the carbonization.

[E03] A method for manufacturing a plant-derived porous carbon material used for an electrode, from a surface of which an oxygen-containing functional group has been removed, including carbonizing the plant-derived material at 400° C. to 1400° C., then treating the plant-derived material with an acid or an alkali, and then removing the oxygen-containing functional group from the surface of the porous carbon material.

[E04] The method for manufacturing a porous carbon material according to [E02] or [E03], the oxygen-containing functional group being a carboxy group, a lactone group, a phenol group, a carbonyl group, an ether group, a quinone group, or a hydroxyl group.

[E05] The method for manufacturing a porous carbon material according to any one of [E01] to [E04], the porous carbon material having a value of specific surface area by the nitrogen BET method of 100 m$^2$/g or more, a pore volume by the BJH method of 0.1 cm$^3$/g or more, and a pore volume by the MP method of 0.1 cm$^3$/g or more.

[E06] The method for manufacturing a porous carbon material according to any one of [E01] to [E05], the porous carbon material including a plant-derived material having a silicon content of 5% by mass or more as a raw material.

[E07] The method for manufacturing a porous carbon material according to any one of [E01] to [E06], a silicon component in the plant-derived material after the carbonization being removed by a treatment with an acid or an alkali.

The invention claimed is:

1. An electrode, comprising:
   a porous carbon material that comprises an oxygen-containing functional group,
   wherein a ratio of $P_O/P_C \leq 0.05$ is satisfied,
   wherein the $P_O$ corresponds to a first peak area of an O (1s) spectrum of the porous carbon material obtained by X-ray photoelectron spectroscopy, and the $P_C$ corresponds to a second peak area of a C (1s) spectrum, and
   wherein the porous carbon material is derived from a plant-derived material.

2. The electrode according to claim 1, wherein a portion of the oxygen-containing functional group is removed from a surface of the porous carbon material.

3. The electrode according to claim 1, wherein the oxygen-containing functional group is one of a carboxy group, a lactone group, a phenol group, a carbonyl group, an ether group, a quinone group, or a hydroxyl group.

4. The electrode according to claim 1, wherein the porous carbon material has a value of specific surface area by a nitrogen BET method of 100 m$^2$/g or more, a pore volume by a BJH method of 0.1 cm$^3$/g or more, and a pore volume by an MP method of 0.1 cm$^3$/g or more.

5. The electrode according to claim 1, wherein the porous carbon material including the plant-derived material has a silicon content of 5% by mass or more as a raw material.

6. A secondary battery, comprising:
   an electrode containing a porous carbon material, wherein the porous carbon material comprises an oxygen-containing functional group; and
   a negative electrode,
   wherein a ratio of $P_O/P_C \leq 0.05$ is satisfied,
   wherein the $P_O$ corresponds to a first peak area of an O (1s) spectrum of the porous carbon material obtained by X-ray photoelectron spectroscopy, and the $P_C$ corresponds to a second peak area of a C (1s) spectrum, and
   wherein the porous carbon material is derived from a plant-derived material.

7. The secondary battery according to claim 6, wherein a portion of the oxygen-containing functional group is removed from a surface of the porous carbon material.

8. The secondary battery according to claim 6, wherein the oxygen-containing functional group is one of a carboxy group, a lactone group, a phenol group, a carbonyl group, an ether group, a quinone group, or a hydroxyl group.

9. The secondary battery according to claim 6, wherein the porous carbon material has a value of specific surface area by a nitrogen BET method of 100 m$^2$/g or more, a pore volume by a BJH method of 0.1 cm$^3$/g or more, and a pore volume by an MP method of 0.1 cm$^3$/g or more.

10. The secondary battery according to claim 6, wherein the porous carbon material comprises the plant-derived material has a silicon content of 5% by mass or more as a raw material.

11. The secondary battery according to claim 6, wherein a positive electrode is made from the electrode.

12. The secondary battery according to claim 11, wherein the secondary battery is made from an air-metal secondary battery.

13. The secondary battery according to claim 12, wherein the secondary battery is made from an air-lithium secondary battery.

14. A method of manufacturing an electrode including a porous carbon material which further comprises an oxygen-containing functional group, the method comprising:
   removing a portion of the oxygen-containing functional group from a surface of the porous carbon material;
   satisfying a ratio of $P_O/P_C \leq 0.05$,
   wherein the $P_O$ corresponds to a first peak area of an O (1s) spectrum of the porous carbon material obtained by X-ray photoelectron spectroscopy, and the $P_C$ corresponds to a second peak area of a C (1s) spectrum;
   obtaining the porous carbon material by carbonizing a plant-derived material at a first temperature that is in range of 400° C. to 1400° C.;
   treating the plant-derived material with an acid or an alkali; and
   heating the plant-derived material at a second temperature that is higher than the first temperature.

15. The method for manufacturing the electrode according to claim 14, wherein the oxygen-containing functional group is one of a carboxy group, a lactone group, a phenol group, a carbonyl group, an ether group, a quinone group, or a hydroxyl group.

16. The method for manufacturing the electrode according to claim 14, wherein the porous carbon material has a value of specific surface area by a nitrogen BET method of 100 m$^2$/g or more, a pore volume by a BJH method of 0.1 cm$^3$/g or more, and a pore volume by an MP method of 0.1 cm$^3$/g or more.

17. The method for manufacturing the electrode according to claim 14, wherein the porous carbon material comprises a plant-derived material having a silicon content of 5% by mass or more as a raw material.

18. The method for manufacturing the electrode according to claim 14, wherein a silicon component is removed from the plant-derived material after carbonization, by treatment with the acid or the alkali.

* * * * *